Patented Jan. 4, 1927.

1,613,125

UNITED STATES PATENT OFFICE.

EDWARD V. RAWN, OF HOPKINSVILLE, KENTUCKY.

METHOD OF MAKING FERROPHOSPHORUS.

No Drawing.   Application filed April 12, 1926.   Serial No. 101,574.

This invention relates to a new and improved method for the production of ferro-phosphorus and more particularly to a duplex or two step method for carrying on the production.

There are a number of commercial methods for the production of phosphoric acid, the acid being produced by the treatment of phosphatic material in the presence of carbon and silica by the action of heat at proper temperatures. These re-agents are commercially applied at the present time in phosphoric acid production in various types of apparatus. The heat for carrying the reaction may be furnished by the burning of coke in a suitable furnace of the blast furnace type or the heat may be furnished by an electric arc in an electric furnace of the open hearth type. Other methods for the production of phosphoric acid consist in the treatment of phosphate of lime with sulphuric acid. By this method soluble phosphoric acid is produced together with a large number of other compounds present as impurities, these including fluosilicic acid, hydrofluoric acid, acid phosphate of iron, alumina, manganese, copper, zinc, cadmium, etc.

These various methods of production have different results and advantages. The electric arc, for example, when suitably applied, produces ferro-phosphorus of high phosphorus content, etc. It has the disadvantage of consuming large quantities of relatively expensive electric energy and also requires the use of a considerable amount of coke. The sulphuric acid process has the advantage of a large production of phosphoric acid, but this acid is contaminated with large quantities of impurities, the separation of which renders the process highly expensive and results in the production of phosphoric acid of lower purity than that obtained by the electric process.

It is an object of the present invention to provide a new and improved method for the production of ferro-phosphorus and the like, whereby production is carried on at a moderate cost and with the production of ferro-phosphorus of high phosphorus content.

It is a further object to provide a method of this character in which the quantity of electric energy required is materially reduced while retaining the advantages of the high qualities of the products of the electric process.

It is an additional object to provide a method of this character adapted to be carried out upon a commercial scale by the use of apparatus at present customary in the art. Other and further objects will appear as the description proceeds.

As the first step in my process ferro-phosphorus is prepared in a blast furnace by heating by use of coke or charcoal a charge comprising tri-calcium-phosphate to furnish both the lime required in the furnace to neutralize the silica present in the ore, and also to furnish the phosphorus which is required for the production of the ferro-phosphorus. The relative quantities of the ore, tri-calcium-phosphate and coke will be so proportioned as to produce a product as high in phosphorus as can be prepared economically. This depends on a variety of factors including the carbon consumption per unit of phosphorus, the tonnage per unit of equipment and other factors which are well known by those skilled in the art. Instead of tri-calcium phosphate any other readily fusible material rich in phosphorus may be used. Such a material is nelsonite, which contains phosphorus, calcium and silica. An acid flux such as silica or alumina may be added. Mill cinder containing iron, phosphorus and slag may be used as a part of the burden in the furnace which may consist of various combinations of materials to take care of differing operating conditions and results desired. By this method ferro-phosphorus having a phosphorus content of ten (10) to sixteen (16) per cent can be manufactured.

The ferro-phosphorus from the blast furnace is now transferred to the electric furnace with a minimum possible loss of heat. In the electric furnace the molten ferro-phosphorus has added thereto phosphorus containing materials such as are commonly used in the electric furnace production of ferro-phosphorus. As an example of such material citrate soluble phosphate may be used in a burden suitable for an electric furnace. These materials are furnished to the electric furnace in such proportion as to give ferro-phosphorus containing a high phosphorus content and at the same time, to produce such quantities of phosphoric acid as may be required. It is commercially practical to raise the phosphorus content of the furnace made ferro-phosphorus to from twenty-two (22) to twenty-six (26) per cent by this method.

This process has the advantage of operating upon the cheapest available raw materials and the cost of the re-agents for liberating the phosphorus is reduced by minimizing the electric heat required. The electric power is the most expensive element and the present process reduces the electricity required, in that electric heat is not used to melt down the ore or to produce more than a minimum of slag, but is only used to produce sufficient heat to cause the additional combination of the phosphorus, present in the electric furnace charge, with that already present in the previously blast furnace-prepared low phosphorus content ferro-phosphorus. An additional advantage of the process lies in the fact that the ferro-phosphorus is produced in the most marketable form, being of the highest purity, and having a high phosphorus content.

In ferro-phosphorus made in a coke fired blast furnace, much sulphur is of a necessity forced into ferro-phosphorus of grades so made running above fifteen (15) per cent in phosphorus by reason of the large amount of sulphur-bearing coke necessarily used in making available the phosphorus in the phosphatic charge. In this process, only the lower grades of ferro-phorphorus are made in the blast furnace, such for instance as are now freely made in many blast furnaces throughout the United States, although it is desired to increase the phosphorus present beyond that usually placed in the iron desired not to contain as much as six (6) to eight (8) per cent phosphorus.

I claim:

1. The method of making ferro-phosphorus of high phosphorus content which comprises the production of ferro-phosphorus of relatively low phosphorus content, the transfer of said ferro-phosphorus to an electric furnace, and the treatment of said ferro-phosphorus in the electric furnace with phosphorus containing material and a suitable flux to raise the phosphorus content of the ferro-phosphorus.

2. The method of making ferro-phosphorus of high phosphorus content which comprises the production of ferro-phosphorus having a phosphorus content of from ten to sixteen per cent, the transfer of said ferro-phosphorus to an electric furnace, and the treatment of said ferro-phosphorus in the electric furnace with phosphorus containing material and a suitable flux to raise the phosphorus content of the ferro-phosphorus.

3. The method of making ferro-phosphorus of high phosphorus content which comprises the production of ferro-phosphorus having a phosphorus content of from ten to sixteen per cent, the transfer of said ferro-phosphorus to an electric furnace, and the treatment of said ferro-phosphorus in the electric furnace with phosphorus containing material and a suitable flux to raise the phosphorus content of the ferro-phosphorus to not more than thirty per cent phosphorus.

4. The method of making ferro-phosphorus of high phosphorus content which comprises the production of ferro-phosphorus of relatively low phosphorus content, by a blast furnace process, the transfer of said ferro-phosphorus to an electric furnace, and the treatment of said ferro-phosphorus in the electric furnace with phosphorus containing material and a suitable flux to raise the phosphorus content of the ferro-phosphorus.

5. The method of making ferro-phosphorus of high phosphorus content which comprises the production of ferro-phosphorus of relatively low phosphorus content by a blast furnace process, the transfer of said ferro-phosphorus while molten to an electric furnace, and the further immediate treatment of said ferro-phosphorus in the electric furnace together with phosphorus containing material and a suitable flux, to raise the phosphorus content of the ferro-phosphorus.

6. The method of making ferro-phosphorus of high phosphorus content which comprises the production of ferro-phosphorus of relatively low phosphorus content by a blast furnace process, from iron ore, tri-calcium phosphate, carbonaceous fuel and acid flux, the transfer of said ferro-phosphorus while molten to an electric furnace, and the further immediate treatment of said ferro-phosphorus in the electric furnace together with phosphorus containing material and a suitable flux, to raise the phosphorus content of the ferro-phosphorus.

7. The method of making ferro-phosphorus of high phosphorus content which comprises the production of ferro-phosphorus of relatively low phosphorus content by a blast furnace process, from metallic iron, iron core, tri-calcium phosphate, carbonaceous fuel and acid flux, the transfer of said ferro-phosphorus while molten to an electric furnace, and the further immediate treatment of said ferro-phosphorus in the electric furnace together with phosphorus containing material and a suitable flux, to raise the phosphorus content of the ferro-phosphorus.

8. The method of making ferro-phosphorus of high phosphorus content which comprises the production of ferro-phosphorus of relatively low phosphorus content by a blast furnace process, from mill cinders, iron ore, phosphate rock, carbonaceous fuel and acid flux, the transfer of said ferro-phosphorus while molten to an electric furnace, and the further immediate treatment of said ferro-phosphorus in the electric furnace together with phosphorus containing material and a suitable flux, to raise the phosphorus content of the ferro-phosphorus.

Signed at Nashville, Tennessee, this 9th day of April, 1926.

EDWARD V. RAWN.